(12) United States Patent
Martinez

(10) Patent No.: US 7,226,191 B1
(45) Date of Patent: Jun. 5, 2007

(54) LIGHTED HANDGRIP ASSEMBLY

(76) Inventor: Carlos Martinez, 716 Bark Ct., Lake Barrington, IL (US) 60010

( * ) Notice: Subject to any disclaimer, the term of this patent is extended or adjusted under 35 U.S.C. 154(b) by 247 days.

(21) Appl. No.: 11/076,777

(22) Filed: Mar. 10, 2005

(51) Int. Cl.
*F21V 21/08* (2006.01)

(52) U.S. Cl. ..................... 362/400; 362/501
(58) Field of Classification Search ............... 362/399, 362/400, 501
See application file for complete search history.

(56) References Cited

U.S. PATENT DOCUMENTS

| | | | |
|---|---|---|---|
| 3,967,850 A | 7/1976 | Whisler | |
| 4,023,827 A | 5/1977 | Matalonis et al. | |
| 4,073,036 A | 2/1978 | Bustin | |
| 5,025,352 A | 6/1991 | Brown | |
| 5,428,512 A | 6/1995 | Mouzas | |
| 5,622,423 A * | 4/1997 | Lee ............................. | 362/186 |
| 6,415,732 B1 | 7/2002 | Delorenzo | |
| 6,431,643 B2 | 8/2002 | Grey | |
| 6,447,055 B1 | 9/2002 | Mainville et al. | |
| 6,523,888 B1 | 2/2003 | Van et al. | |
| 6,527,334 B2 | 3/2003 | Oliver | |
| 6,553,629 B2 | 4/2003 | Grady et al. | |
| 6,554,338 B1 | 4/2003 | Spence | |
| 6,647,594 B1 | 11/2003 | Deb et al. | |
| 6,793,385 B2 | 9/2004 | Tiesler et al. | |
| 6,799,863 B2 | 10/2004 | Offiler et al. | |
| 2003/0095404 A1* | 5/2003 | Becks et al. ................. | 362/185 |
| 2004/0027837 A1* | 2/2004 | Hsu ........................... | 362/551 |
| 2004/0130909 A1* | 7/2004 | Mueller et al. .............. | 362/555 |
| 2005/0047164 A1* | 3/2005 | Houston ..................... | 362/511 |

* cited by examiner

*Primary Examiner*—Thomas M. Sember
*Assistant Examiner*—Julie A. Shallenberger
(74) *Attorney, Agent, or Firm*—Mathew R.P. Perrone; Brie A. Crawford

(57) ABSTRACT

A lighted handgrip assembly has a hand grip housing with the lighting system mounted therein, in order to indicate the location thereof. The handgrip housing includes an inner metal tube and outer plastic tube, which are supported in end caps, one end cap secured to each end of the tube.

6 Claims, 3 Drawing Sheets

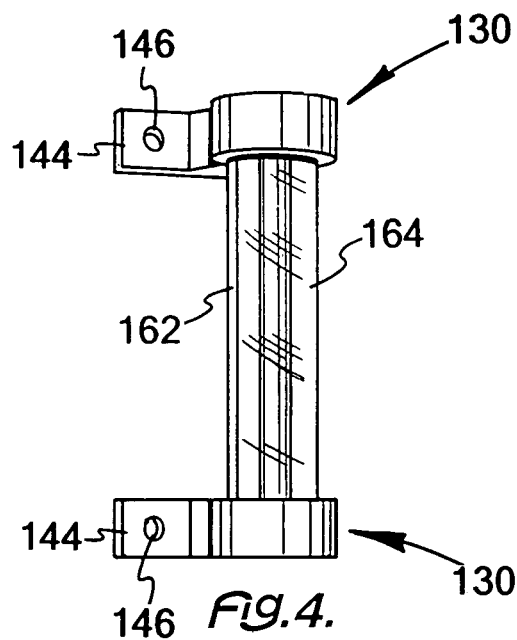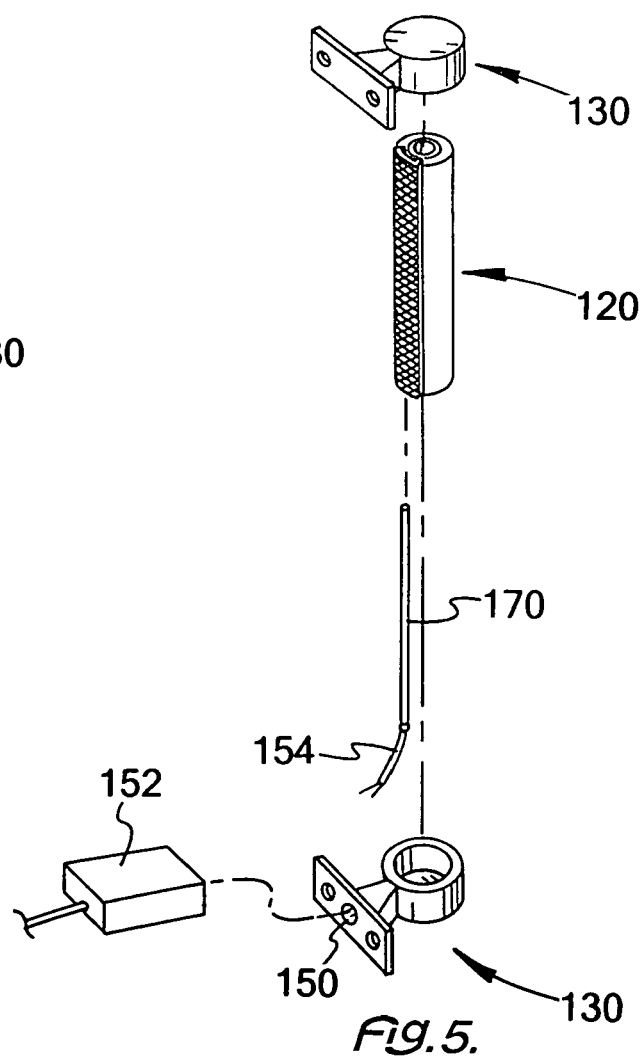

LIGHTED HANDGRIP ASSEMBLY

This invention relates to a lighted handgrip assembly, and more particularly, to a lighted handgrip assembly, which includes a handgrip housing with a light source therein in order to assist with the location thereof.

BACKGROUND OF THE INVENTION

A handgrip may have many uses. It can assist both the healthy person, and one who has a disability. Typically, at least one handgrip is present on a heavy duty vehicle. The handgrip may be, of course, also present on a boat. Various facilities for a handicapped or disabled person have at least one handgrip to assist the person using the facility. Thus, it may be seen that a handgrip serves many functions.

On more than one occasion, it can be desirable for a handgrip to be illuminated. This illumination can be especially important for larger vehicles or handicapped facilities. A major problem with such illumination is the requirement for both durability and reliability.

Inserting the necessary wiring and other structure in the handgrip in order to provide lighting can weaken the structure. If the strength of the handgrip can be maintained, while at the same time providing a lighting source, great advantages can be attained.

The lighting system, which provides a light source for the lighted handgrip assembly, must also be compatible with the handgrip housing. Thus, the lighting assembly may not weaken the handgrip housing. A handgrip housing can be placed under a great deal of stress. So, any lighting assembly compatible therewith must retain that strength.

No appropriate solution for providing a strong handgrip assembly, wherein the handgrip housing may be illuminated is known to prior art. The prior art light assemblies for handgrips weaken the handgrip too much to permit proper use. Thus, great advantages can be obtained with a lighted handgrip assembly, which is sufficiently strong to survive intense use.

The prior art light assemblies for handgrips also complicate the installation of the handgrip assembly. Such a handgrip assembly must be installable, while still providing access to a power source for light or lights. Thus, many problems exist with the preparation of a lighted handgrip assembly.

SUMMARY OF THE INVENTION

Among the many objectives of this invention is the provision of a lighted handgrip assembly, which retains its strength as a handgrip, while providing a light to indicate the location thereof.

A further objective of this invention is the provision of lighted handgrip assembly, which is easily installed.

Yet a further objective of this invention is the provision of a lighted handgrip assembly, which is strong.

A still further objective of this invention is the provision of a lighted handgrip assembly, suitable for use on heavy-duty vehicles.

Another objective of this invention is the provision of a lighted handgrip assembly, suitable for use on a boat.

Yet another objective of this invention is the provision of a lighted handgrip assembly, suitable for use as a handicapped support.

Still, another objective of this invention is the provision of lighted handgrip assembly, suitable for use on heavy-duty vehicles.

These and other objectives of the invention (which other objectives become clear by consideration of the specification, claims and drawings as a whole) are met by providing a lighted handgrip assembly having a handgrip housing with the lighting system mounted therein, in order to indicate the location thereof, further wherein, the handgrip housing includes an inner metal tube and an outer plastic tube, which are supported in end caps, one end cap secured to each end of the tube.

BRIEF DESCRIPTION OF THE DRAWINGS

FIG. 4 depicts an assembled perspective view of a lighted handgrip assembly 100 of this invention.

FIG. 5 depicts a partially assembled perspective view of a lighted handgrip assembly 100 of this invention.

Throughout the figures of the drawings, where the same part appears in more than one figure of the drawings, the same number is applied thereto.

DESCRIPTION OF THE PREFERRED EMBODIMENTS

Figure 1:
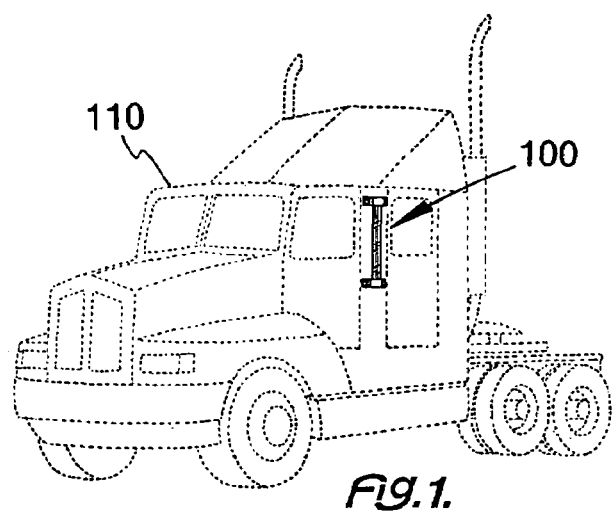
FIG. 1 depicts a perspective view of a lighted handgrip assembly 100 of this invention mounted on a heavy duty vehicle 110.

For the lighted handgrip assembly, the gripping member is mounted on a desired surface by oppositely disposed end cap mounts. As the end cap mounts are secured to a desired surface, the gripping member is positioned therebetween and held firmly in-place.

The gripping member is generally tubular. An inner metal tube fits into an outer plastic tube jacket. Preferably, the outer tube jacket is translucent. It is also operable if the plastic tube jacket is transparent. Within the plastic tube jacket, the inner metal tube provides strength and allows the opposing end caps to support the gripping member and form the lighted grip assembly.

Forming the inner metal tube with the outer plastic tube jacket therearound can be accomplished in many different ways. The individual tubes can be manufactured separately, cut to the appropriate length, and inserted as desired. Most preferred, however, is extruding the outer plastic tube jacket over the inner metal tube.

Each end cap has a tube receiving member with a mounting flange extending therefrom. The perimeter or inside diameter of the tube receiving member matches the cross-sectional shape of the gripping member. Therefore, the tube receiving member preferably receives an end of the gripping member in a female to male relationship, although the reverse is operable.

Customarily, both the gripping member and the tube receiving member are cylindrical in nature, or circular in cross-section. One end of the tube receiving member is closed, while the other is open. As the gripping member is inserted into the open end, the gripping member can thus become sealed or secured therein.

On the end cap extending from the tube receiving member, is a mounting flange. The mounting flange includes a support member extending from the tube receiving member and flanges on a support member oppositely disposed from the tube receiving member. Within the flanges, are mounting apertures.

If desired, an electrical aperture communicates with the gripping member, the tube receiving member, and the mounting flange. The electrical aperture receives wires of an electrical circuit from the lighting assembly for lighted gripping assembly mounted in the gripping member. The mounting apertures at each end of the mounting flange permit the lighted gripping assembly to be secured to a desired surface.

If desired, a circuit box may be included in wiring system. Mounting of the circuit box can be accomplished in any suitable fashion. The circuit box can be set up in any suitable fashion. For example, the circuit box can include electrical structure to permit the lights in the gripping member to flash, remain steady, or provide combinations thereof. Clearly, an adjustment in the flashing rate of the lighting assembly is also possible due to the circuit box.

The gripping member preferably has a metal reinforcing tube within a plastic tube. If the metal reinforcing tube includes a plurality of apertures, the lighting system may be mounted therein and resulting light transmitted through the apertures. If the metal reinforcing tube lacks apertures, the plastic tube includes a clamping slot to receive a lighting assembly. Such a lighting assembly can be mounted anywhere within the slot. If the light assembly is mounted centrally, an efficient method of connecting lighting assembly for the light handgrip assembly is to run the electrical circuit therefrom through an aperture in the metal tube and down to the electrical aperture.

As above stated, within plastic tube may be a clamping slot extending down the outside thereof and adapted to receive a sliding clamp member. The central slot of the clamping slot receives the light assembly, to provide the lighted handgrip when the metal tube lacks perforations.

The clamping slot has two ridges forming the sides of the central slot. Each ridge forms an outer slot in the plastic tube. A sliding clamp member slides or snaps over the two ridges into the outer slots to close the clamping slot and contain the light assembly in the central slot. The sliding clamp member may have an exterior gripping surface. Such a gripping surface minimizes the chance of the grip slipping on the lighted gripping assembly.

Referring now to FIG. 1, lighted handgrip assembly 100 of this invention is mounted on a heavy duty vehicle 110. The gripping member 120 of the lighted handgrip assembly 100 is mounted on a desired surface of heavy duty vehicle 110 by oppositely disposed end cap mounts 130. As the end cap mounts 130 are secured to a mounting surface 180, the gripping member 120 is positioned therebetween and held firmly in-place.

Mounting surface 180 is any suitable surface which will support lighted handgrip assembly 100. Mounting surface 180 may be at heavy duty vehicle 110 or any other desired surface. Such desired surfaces include, but are not limited to, a boat, a handicapped facility, and a stairway. Examples of a handicapped facility includes, but not limited to, a toilet and a shower. Clearly, mounting surface 180 may be any area where the lighted handgrip assembly 100 is desirable or required.

Figure 2:
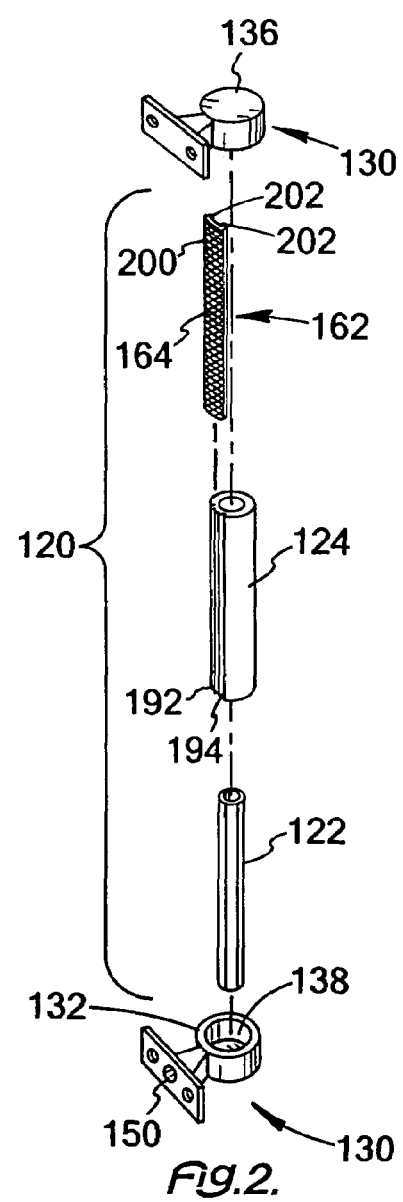
FIG. 2 depicts an exploded perspective view of a lighted handgrip assembly 100 of this invention.

Adding FIG. 2 to the consideration, the gripping member 120, has an inner metal tube 122 fitting into an outer plastic tube jacket 124. The outer tube jacket 124 receives on each end thereof an end cap mount 130. Each of the end cap mounts 130 has a tube receiving member 132 with a mounting flange 134 extending therefrom. The tube receiving member 132 matches the shape of the gripping member 120.

The tube receiving member 132 has a closed end 136 and an oppositely disposed open end 138. As the gripping member 120 fits into the open end 138, the gripping member 120 thus becomes secured between two end caps 130.

Figure 3:
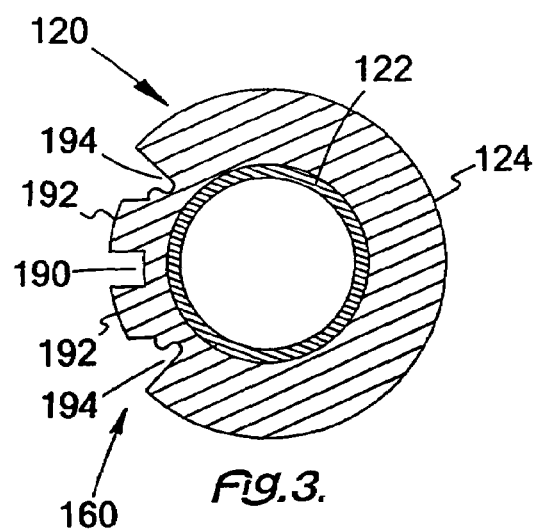
FIG. 3 depicts an end, cross-sectioned view of gripping member 120 for the lighted handgrip assembly 100 of this invention.

Further considering FIG. 3, FIG. 4 and FIG. 5, on each end cap mount 130 extending from the tube receiving member 132 is a mounting flange 134. The mounting flange 134 includes a support member 142 extending from the tube receiving member 132, with flanges 144 on the support member 142 oppositely disposed from the tube receiving member 132. Within the flanges 144, are mounting apertures 146.

If desired, an electrical aperture 150 communicates with the gripping member 120, the tube receiving member 132, and the mounting flange 134. The electrical aperture 150 receives electrical circuit 154 or a circuit box 152 from the lighting assembly 170 mounted in the gripping member 120 for lighted gripping assembly 100. Mounting apertures 146 at each end of the mounting flange 144 permit the lighted gripping assembly 100 to be secured to a desired surface.

Additionally, within plastic tube jacket 124 may be a clamping slot 160 extending down the outside thereof and adapted to receive a sliding clamp member 162. Central lighting slot 190 in clamping slot 160 receives lighting assembly 170, which is held in a desired position by the sliding clamp 162.

The sliding clamp member 162 may have a gripping surface 164. Sliding clamp 162 may also use the slide features to snap fit into plastic tube jacket 124, thereby providing easy service of the lighting assembly 170. Such a gripping surface 164 minimizes the chance of the grip of a person slipping on the lighted gripping assembly 100.

As above set forth, the gripping member 120, has an inner metal tube 122 fitting into an outer plastic tube jacket 124. Lighting assembly 170 may be mounted in outer tube jacket 124 at central slot 190. Central slot 190 has flanges 192 on either side thereof. Each flange 192 forms an outer slot 194 with the outer plastic tube jacket 124.

The sliding clamp member 162 slides or snap fits over flanges 192. Snap fitting can make it easier to service the lighting assembly 170 with the lighted gripping assembly 100 left in place, instead of removing the same in order to provide the service. If the inner metal tube 122 is perforated, lighting assembly 170 may be mounted inside the metal tube 122.

More particularly, the sliding clamp member 162 has an elongated central support 200, with gripping members 202 extending therefrom. It is each of gripping members 202, which slides or snap fits over one of flanges 192, thereby permitting elongated central support 200 to close central slot 190 and secure the lighting assembly 170 therein.

Figure 6:
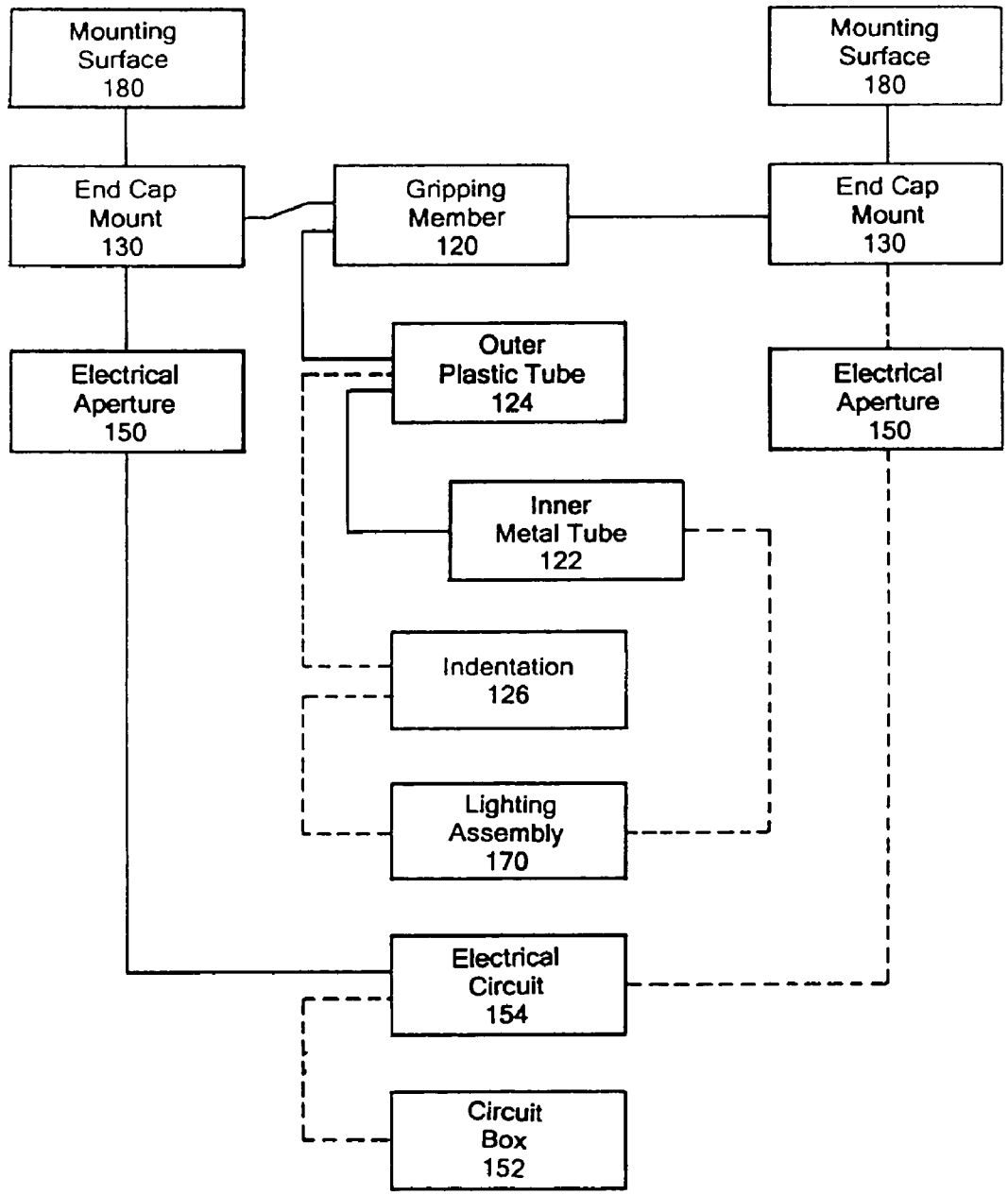
FIG. 6 depicts a block diagram for the lighted handgrip assembly 100 of this invention.

FIG. 6 shows the flexibility of lighted handgrip assembly 100. Mounting surface 180 may be any area, including, but not limited to a land or a water vehicle, a handicapped facility or a stationary place. Typical land vehicles includes emergency vehicles, heavy duty vehicle or any requiring the same. End cap mounts 130 hold gripping member 120 in the desired position. Gripping member 120 contains inner metal tube 122 within outer plastic tube 124.

Outer plastic tube 124 may have indentation 126 the same as central slot 190 or in another suitable structure. Lighting assembly 170 may either be within indentation 126 or inner metal tube 122, if the metal tube 122 is perforated. Indentation 126 serves the same function as central slot 190, that is support the lighting assembly 170. Electrical circuit 154 from lighting assembly 170 communicates with the end cap 130 using electrical aperture 150 for the purpose of illuminating or providing power to the lighting assembly 170 that is within gripping member 120.

As can be seen from FIG. 6, only one of end cap 130 needs to have electrical aperture 150. However, it is sometimes desirable to have the electrical aperture 150 in both of the end caps 130, for ease of assembly and reduction of parts for assembly.

Circuit box 152 may also be included within electrical circuit 154. Circuit box 152, when used, provides different functions for lighting assembly 170. Such functions include, but are limited to, remotely activating or deactivating of the lighting assembly 170, providing a flashing mechanism for the lighting assembly with an adjustable or fixed, off and on timing parameters.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A lighted handgrip assembly comprising:
    (a) a gripping member being mounted between a first end cap mount and a second end cap mount;
    (b) the gripping member having a lighting assembly mounted therein;
    (c) the lighting assembly serving to indicate a location of the lighted handgrip assembly;
    (d) the gripping member having an inner metal tube in an outer plastic tube jacket;
    (e) the outer plastic tube jacket being translucent or transparent;
    (f) the first end cap mount and the second end cap mount being similar in structure;
    (g) the first end cap mount having a tube receiving member with a mounting flange extending from the tube receiving member;
    (h) the mounting flange providing a mounting means to secure the lighted handgrip assembly on a desired surface;
    (i) the tube receiving member matching the cross-sectional shape of the gripping member perimeter;
    (j) the tube receiving member having a closed end oppositely disposed from an open end;
    (k) the gripping member being inserted into the open end, in order to be sealed or secured therein;
    (l) the gripping member and the tube receiving member having a circular cross-section;
    (m) the first end cap mount having an electrical aperture;
    (n) the electrical aperture communicating with the gripping member and the tube receiving member;
    (o) the mounting means including at least one mounting aperture in the mounting flange;
    (p) the mounting flange having a first flange end oppositely disposed from a second flange end;
    (q) the first flange end and the second flange end including the mounting aperture;
    (r) the inner metal tube being perforated;
    (s) the lighting assembly being mounted in the inner metal tube.
    (t) the outer plastic tube jacket including an indentation; and
    (u) the indentation receiving the lighting assembly.

2. The lighted handgrip assembly of claim 1 further comprising:
    (a) the outer plastic tube jacket including a clamping slot;
    (b) the clamping slot having a central slot, a pair of flanges and a pair of outer slots;
    (c) the central slot having one of the pair of flanges on either side thereof;
    (d) each flange of the pair of flanges forming the outer slot with the outer plastic tube jacket;
    (e) the central slot receiving lighting assembly; and
    (f) the clamping slot receiving a sliding clamp member.

3. The lighted handgrip assembly of claim 2 further comprising:
    (a) the sliding clamp member having a gripping surface;
    (b) the sliding clamp member having an elongated central support with a pair of gripping members extending from each side thereof;
    (c) each of the pair of gripping members fitting over one of flanges and into one of the pair of outer slots, thereby permitting the elongated central support to close the central slot and secure the lighting assembly therein; and
    (d) the gripping surface being situated on the elongated central support and minimizing a chance of a grip slipping on the lighted gripping assembly.

4. The lighted handgrip assembly of claim 3 further comprising:
    (a) the mounting flange including a support member extending from the tube receiving member;
    (b) the first flange end and the second flange extending from the support member and oppositely disposed from the tube receiving member; and
    (c) the electrical circuit including a circuit box adapted to adjust a light from the lighting system.

5. In a surface having a hand grip thereon, the improvement comprising:
    (a) the handgrip being replaced with a lighted handgrip assembly;
    (b) a gripping member being mounted between a first end cap mount and a second end cap mount;
    (c) the gripping member having a lighting assembly mounted therein;
    (d) the lighting assembly serving to indicate a location of the lighted handgrip assembly;
    (e) the gripping member having an inner metal tube in an outer plastic tube jacket;
    (f) the outer plastic tube jacket being translucent or transparent;
    (g) the first end cap mount and the second end cap mount being similar in structure;
    (h) the first end cap mount having a tube receiving member with a mounting flange extending from the tube receiving member;
    (i) the mounting flange providing a mounting means to secure the lighted handgrip assembly on a desired surface;
    (j) the tube receiving member matching the cross-sectional shape of the gripping member perimeter;

(k) the tube receiving member having a closed end oppositely disposed from an open end;

(l) the gripping member being inserted into the open end, in order to be sealed or secured therein;

(m) the gripping member and the tube receiving member having a circular cross-section;

(n) the first end cap mount having an electrical aperture;

(o) the electrical aperture communicating with the gripping member and the tube receiving member;

(p) the mounting means including at least one mounting aperture in the mounting flange;

(q) the mounting flange having a first flange end oppositely disposed from a second flange end;

(r) the first flange end and the second flange end including the mounting aperture;

(s) the inner metal tube being perforated;

(t) the lighting assembly being mounted in the inner metal tube;

(u) the outer plastic tube jacket including an indentation;

(v) the indentation receiving the lighting assembly; and (w) the electrical circuit including a circuit box adapted to adjust a light from the lighting system.

6. The surface of claim 5 further comprising the surface being at least one surface selected from a heavy duty vehicle, an emergency vehicle, a boat, a stairway and a handicapped facility.

* * * * *